June 9, 1942.  C. F. WALLACE  2,285,849
ELECTRIC GENERATOR APPARATUS
Filed Feb. 7, 1940  4 Sheets-Sheet 1

INVENTOR.
CHARLES F. WALLACE
BY Cooper, Kerr & Dunham
ATTORNEYS

June 9, 1942.  C. F. WALLACE  2,285,849
ELECTRIC GENERATOR APPARATUS
Filed Feb. 7, 1940  4 Sheets-Sheet 2

INVENTOR.
CHARLES F. WALLACE
BY Cooper, Kerr & Dunham
ATTORNEYS

June 9, 1942. C. F. WALLACE 2,285,849
ELECTRIC GENERATOR APPARATUS
Filed Feb. 7, 1940 4 Sheets-Sheet 3

INVENTOR.
CHARLES F. WALLACE
BY Cooper, Kerr & Dunham
ATTORNEYS

June 9, 1942.　　　C. F. WALLACE　　　2,285,849
ELECTRIC GENERATOR APPARATUS
Filed Feb. 7, 1940　　　4 Sheets-Sheet 4
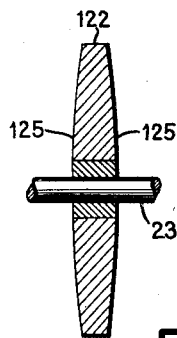
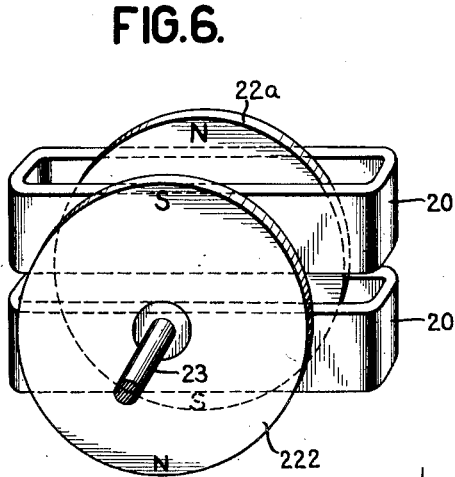
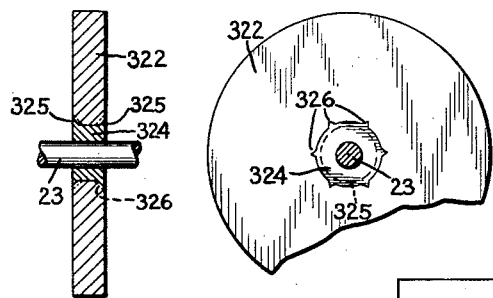
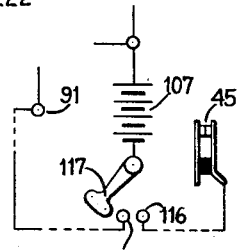
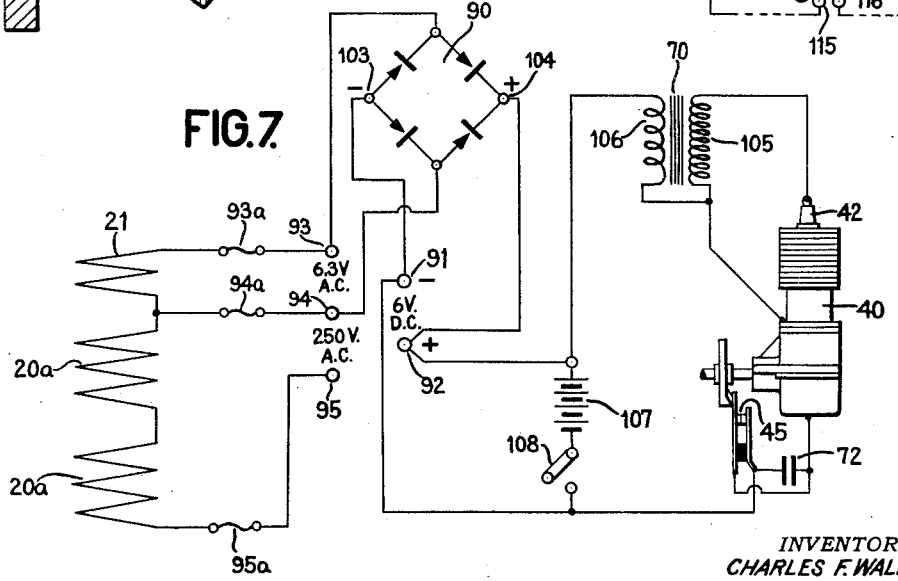
INVENTOR.
CHARLES F. WALLACE
BY Cooper, Kerr & Dunham
ATTORNEYS Patented June 9, 1942

2,285,849

UNITED STATES PATENT OFFICE 2,285,849

ELECTRIC GENERATOR APPARATUS

Charles F. Wallace, Westfield, N. J., assignor to Wallace & Tiernan Products, Inc., Belleville, N. J., a corporation of New Jersey Application February 7, 1940, Serial No. 317,635

8 Claims. (Cl. 290—1)

This invention relates to electric generator apparatus, more particularly to apparatus of light weight or portable type for generating electric energy, e. g., as a source of supply for radio equipment; and in one important specific aspect, the invention relates to small or portable engine-driven generator apparatus to constitute a fully self-contained source of electric power.

One object of the invention is to provide an improved and highly efficient electric generator which may be compact and light in weight and which may be driven from a comparatively small source of power. A further object is to provide a novel engine generator device of a portable nature and particularly reliable in operation. An important use for such apparatus is in meteorological work, for instance in meteorological apparatus of the balloon type, either free or captive, wherein an automatic radio transmitter is provided to transmit readings of weather conditions in the regions through which the balloon travels; and it is accordingly an object of the invention to provide a self-contained power unit of engine driven type which is advantageously adapted for inclusion in balloon-carried apparatus, particularly by reason of lightness of weight, ruggedness, reliability, and ability to supply electrical energy in substantial quantity over a desirably long period and with a comparatively small amount of fuel.

Other objects of the invention are to provide improved electric generating apparatus, which will have a substantial output of alternating current at comparatively high voltages and without the excess weight or the high hysteresis, eddy current or other losses, which would be characteristic of an adaptation of prior forms of generator devices to attain such results; to provide generating apparatus efficiently operative at high speeds for energy output sufficient to operate transmitting apparatus of substantial range, using electron tubes, and at the same time to provide an alternating current output at a frequency sufficiently high to be employed, for instance, as a basis for signal modulation; to provide an improved engine and generator combination having simple and notably efficient arrangements for energizing the ignition system of the engine both in starting and running; to provide generator apparatus in rugged and shock-proof form so as to withstand hard usage, and for example, so as to permit recovery of the apparatus unharmed upon its descent with other apparatus of a meteorological balloon; and to provide other novel and improved features and combinations of instrumentalities in electric generator apparatus.

Further objects and advantages include those hereinafter stated or apparent in connection with the following disclosure of the invention as exemplified in certain advantageous physical embodiments, set forth by way of illustration.

Referring to the drawings.

Figure 4:
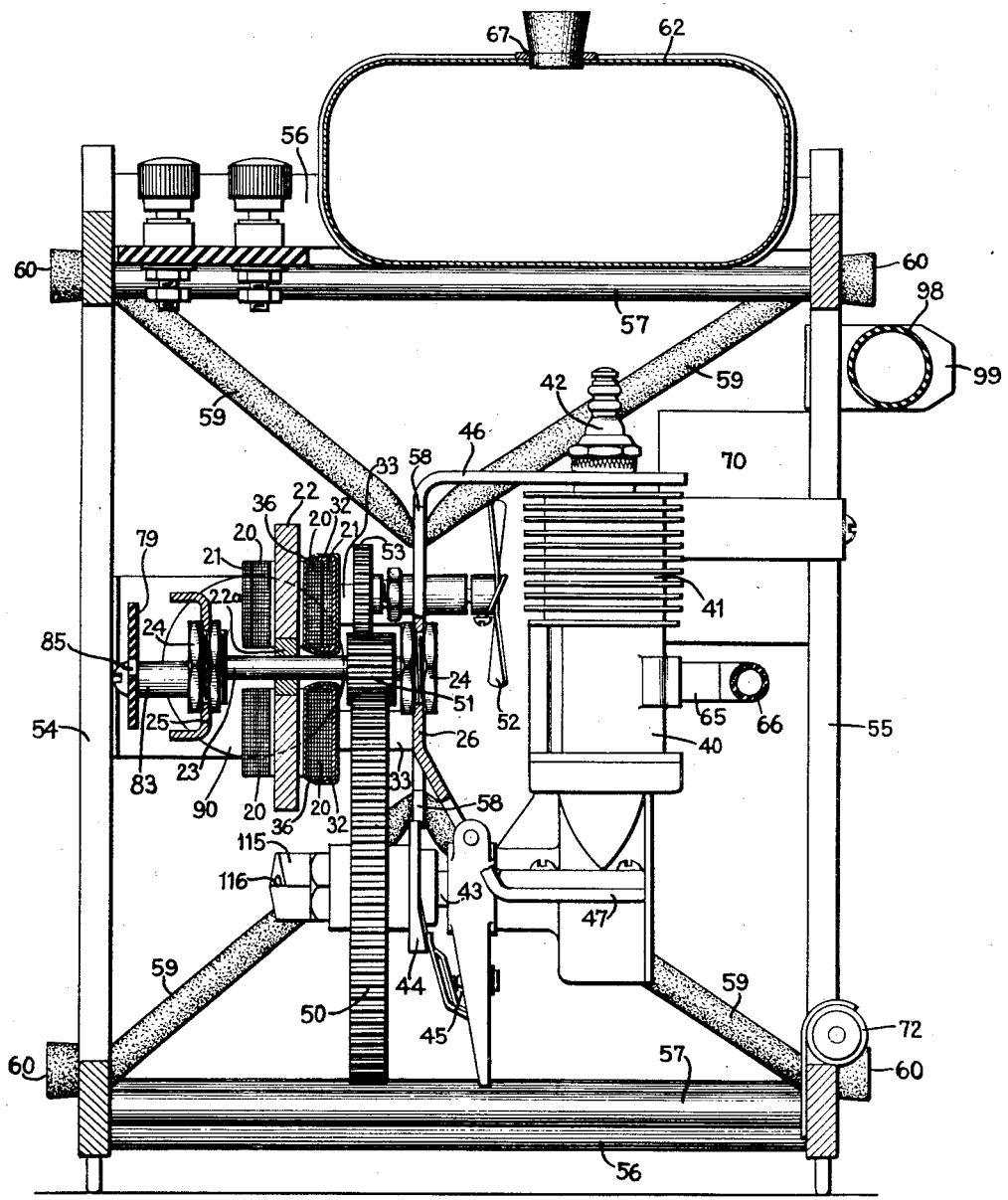
Fig. 4 is a vertical side view, looking from the right-hand side of Fig. 1 and with various parts in section on line 4—4 of Fig. 1.
Figure 4A:
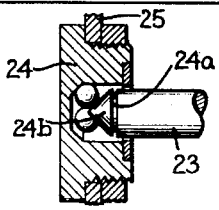

Fig. 4—A is a detail vertical section of a bearing shown in Fig. 4;

Fig. 5 is a section, corresponding to a fragmentary portion of Fig. 4, showing a modified form of rotor for the generator.

Figure 10:
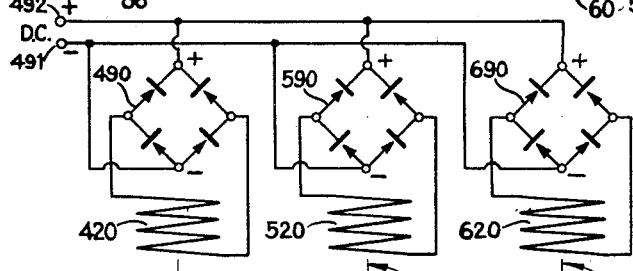

Fig. 6 is a perspective generalized view showing another modified form of generator;

Fig. 7 is a wiring diagram showing a particularly advantageous form of electrical connections;

Fig. 7—A shows a modification of part of the wiring of Fig. 7;

Figs. 8 and 9 are a section and fragmentary elevation respectively, showing a modified form of rotor mounting; and Fig. 10 shows diagrammatically another modification, embodying a multiple generator structure.

Figure 1:
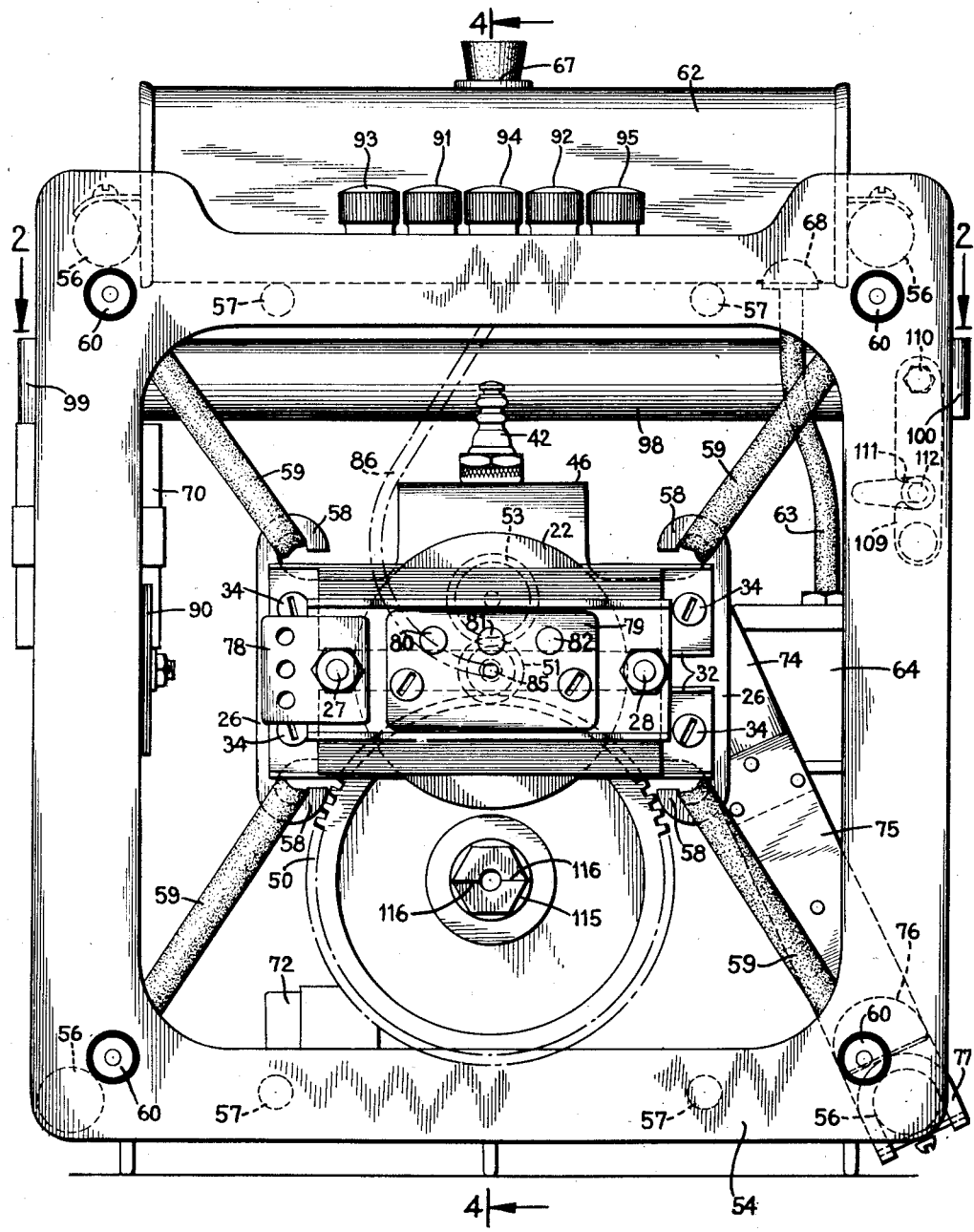
Figure 1 is an end elevation of a generator device embodying the invention.
Figure 2:
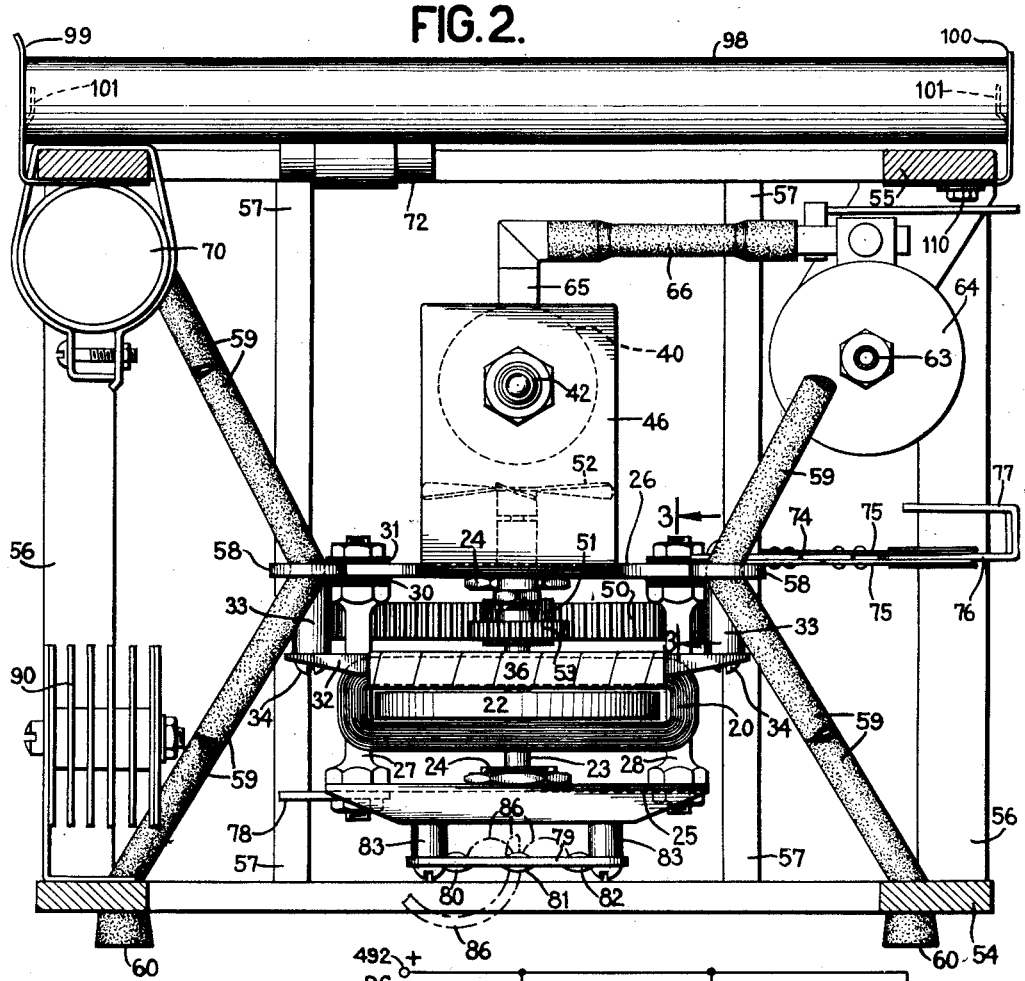
Fig. 2 is a section on line 2—2 of Fig. 1.

Referring particularly to Figs. 1, 2 and 4, the apparatus comprises a small internal combustion engine and a generator having stationary windings and a rotor driven by the engine. In the apparatus illustrated, the stationary windings, from which the supply of electrical energy may be drawn, comprise a plurality of windings and include a pair of coils or solenoids 20, 20, wherein the turns are preferably so disposed and electrically connected as to provide, in effect, a single continuous winding in the same direction; i. e., the windings are arranged to operate as a unitary inductive device for the generation of electromotive force therein under influence of the moving field of the rotor hereinafter described. It will be understood, however, that the solenoids or their windings may be tapped or may be made of electrically separate units to provide various voltage or current outputs, as desired.

For example, in the illustrated embodiment, all of one winding part 20 and a major portion of the other winding part 20 (thus constituting the coils 20a, 20a of the wiring diagram, Fig. 7) are electrically connected to operate as a unit in the generation of electromotive force under the influence of the field produced by the rotor; and the remaining small portion 21 of the second-mentioned winding, although electrically connected to and effective in the same direction as the remainder of the winding, is tapped off to provide a low voltage output,—e. g., for ignition supply to the engine and also, for example, to supply the filaments or heaters of the electron tubes in radio equipment (where the apparatus is used for energizing such equipment). It will be understood that although the upper winding 20 of Fig. 4 is shown as a single winding with a tap to separate the low voltage portion 21, one or both of the units 20 may comprise a plurality of different or individual windings; for instance, the filament supply winding may consist of a relatively few turns of heavy wire to give a low voltage and heavy current output, and the plate supply winding may comprise many turns of fine wire to yield a high voltage and a relatively small current.

Each winding element 20 conveniently comprises a self-supporting coil having an air core of elongated substantially rectangular cross-section (see Fig. 2), the two windings being spaced apart but so disposed that they have a common axis and their cores provide a continuous opening of the configuration described, within which the rotor 22 rotates. The coils, conveniently wound with enamelled wire, are impregnated with insulating varnish and baked, so as to withstand relatively high voltages and to avoid losses otherwise occasionable by moisture. Although for even higher voltages silk covered wire may be used and each section may be made of a plurality of flat pies (so as to reduce the potential difference between adjacent turns), the illustrated embodiment, satisfactory for many practical uses, employs the simpler type of winding comprising successively superimposed layers. In some cases, as for a small power output, the winding may be disposed only on one side of the rotor shaft, e. g., by omitting one of the winding elements 20.

The rotor 22 is permanently magnetized, or poled, and is advantageously constructed of a magnetic material of high retentive character. Although other para-magnetic materials such as steel or cobalt steel may be used, I at present prefer the alloy which is known by the trade-name "Alnico." The rotor 22 accordingly comprises a magnetized "Alnico" disc of appreciable thickness having its poles, say, at diametrically opposed portions of the periphery, and is mounted on a shaft 23 which extends between the windings 20, 20 and in a direction perpendicular to their common axis, so that the disc 22 can be rotated within the elongated cores of the windings. For convenience in machining, the Alnico disc 22 is carried upon a centrally inserted core element 22a of iron or other more easily machined material, and the element 22a is appropriately drilled and secured to the shaft, as by a driving fit thereon.

Figure 3:
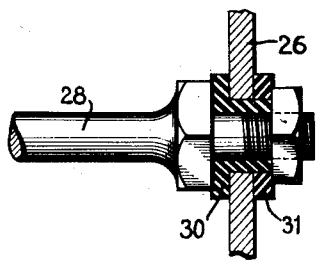
Fig. 3 is an enlarged fragmentary section on line 3—3 of Fig. 2.

The ends of the shaft 23 are respectively journalled, preferably by ball thrust bearings 24, 24 (of which one is shown in Fig. 4—A), in vertical supporting plates 25, 26. Adjacent each bearing the shaft 23 has a small annular groove 24a, so that oil which tends to creep up the tapered shaft surface 24b that makes contact with the balls of the bearing, is prevented, by centrifugal force, from passing the groove, and consequently oil is inhibited from leaking out on the main body of the shaft while the latter is rotating. The supporting plates 25, 26 are appropriately spaced and mounted to each other by suitable metal posts 27, 28, having threaded extremities clamped to the plates by nuts, as shown. In order to minimize eddy current losses and otherwise avoid impairment of efficiency, the metallic circuit which would otherwise be provided by the posts and mounting plates is broken at the mountings on the plate 26, by insulating bushings 30 and insulating washers 31 surrounding the threaded ends of the posts and clamped beneath the retaining nuts, as shown in Fig. 3 (a detail view of post 28).

The windings 20, 20 are carried by metal strips or channels 32, 32, mounted upon suitable spacing collars 33 which receive the screws 34 passing from the outer side of the strips 32, 32 and threaded into the plate 26. The coils are mounted to the strips 32, 32, by suitably secured insulating bindings, such as the wrappings 36 of insulating tape.

The rotor of the generator is driven by a small fuel-burning engine generally designated 40 and conveniently of the internal combustion type. Although other types of engine may be employed, satisfactory results have been had with a single cylinder, air-cooled, two-cycle engine of small size (e. g., rated about ⅕ H. P.), such as is available on the market for use in model airplanes, model motor boats, and the like. In view of the knowledge and availability of such engines, details of internal construction of the engine 40 are not shown, but it will be understood that the same is preferably constructed of aluminum alloy or other light metal, and embodies a single vertical cylinder 41 having radial cooling fins, and a spark plug 42 at its upper end, the piston of the engine being adapted to turn a shaft 43 which projects horizontally from the crankcase casting of the rotor and which carries a timing cam 44 to open and close the ignition contacts 45 at appropriate times in the operation of the engine.

The described engine and electrical generator are preferably mounted together as a unit. To that end, the supporting plate 26 is conveniently provided with horizontal extensions 46, 47 which are respectively secured to upper and lower portions of the engine 40, as shown in Fig. 4.

Although other transmission means may be employed, the engine shaft 43 is coupled to the rotor shaft 23 by means of a large driving gear 50 on the engine shaft, meshing with a drive pinion 51 on the rotor shaft. In the particular form of apparatus illustrated, it was desired to operate the rotor 22 at a very high rate of speed, to obtain a high output wattage with a frequency of the order of 350–400 cycles. In the actual device shown, the rotor 22 was conveniently poled only at opposite sides, and the gear 50 and pinion 51 were constructed with a ratio of 7.4 to 1; and since the particular engine 40 was found to have a shaft speed of about 2950 R. P. M. under the loads obtained in this apparatus, the generator was operated at an extremely high speed, yielding an output frequency in the neighborhood of 364 cycles per second. Carried in a suitable bearing or bushing mounted in the plate 26, a small fan 52 is provided for cooling the engine, and is arranged to be driven by a small gear 53 meshing with the drive pinion 51.

The various gears have a relatively coarse pitch, to avoid breakage at high speeds, and may be satisfactorily made of reinforced fiber, light metals, or other like material.

To support and protect the apparatus, there is provided a frame comprising open side members 54, 55 spaced and connected by a plurality of rods 56 at the corners and further bracing rods 57 at the top and bottom. Although other materials, preferably of light weight, may be used, the frame members and rods are conveniently made of wood. The mounting plate 26 intermediate the engine and the generator is provided with hooks 58 at its corners, and each hook is engaged by a tensioned resilient member, such as a flexible tube 59 made of "Neoprene," thyacol, rubber or the like and secured at its outer ends to the side pieces 55, 54,—the end mounting of the rubber tubes 59 being conveniently achieved by drawing the end of the tube through an appropriate aperture in the frame and then forcing a metal plug 60 into the end of the tube within the hole. With the rubber tubes thus firmly tensioned it will be seen that the unitary engine-generator structure is firmly but resiliently mounted with the frame, in such manner as to protect the unit against severe shocks or jars and to take up the vibration of the unit itself when operating.

A small fuel tank 62 is advantageously mounted on the top of the frame and is arranged to feed by gravity through a flexible tube or hose 63 to a carburetor 64 mounted at the side of the frame adjacent the engine. The mixture of gasoline and air produced by the carburetor is fed to the intake port 65 of the engine through a flexible tube 66 of rubber, "Neoprene" or the like. The tank, having its filling opening 67 at the top, also has a strainer 68 around its outlet. Other engine appurtenances carried by the frame include a suitable ignition coil 70 and a condenser 72 for the timing or breaker contacts.

The resilient mounting structure for the engine-generator unit may also include a vibration damping device. A suitable form of such device comprises a flat arm 74 extending diagonally downward from the mounting plate 26 and carrying a pair of resilient jaws made of flat springs 75, 75 of spring material, such as beryllium copper or phosphor bronze. The jaws 75, 75 engage, in the manner of a knife switch, a flat strip or tongue 76 carried by a U-shaped mounting 77 on one of the lower rods 56 of the frame. It will now be appreciated that the tongue 76 may slide somewhat in the jaws 75, but the frictional engagement of the latter provides an effective damping of the vibrations of the generator unit.

As previously explained, the windings 20, 20 conveniently include a low voltage and high voltage section connected in series, and the resulting three leads from the windings are conveniently guided through an insulating plate 78 mounted at one end of the plate 25 and are soldered to terminal buttons 80, 81, 82 on an insulating terminal plate carried by appropriate studs 83, 83 on the plate 25. The insulating plate 79 is provided with a hole 85 disposed at a point in line with the shaft 23, as shown in Figs. 1, 2 and 4. Conductors from the terminal buttons 80, 81 and 82 are carried to various elements or terminals on the frame, as required, for example, in Fig. 7, by passing the conductors from the inner side of the plate 79 out through the described aperture 85, and thence to the desired terminal connections on or adjacent the frame. By virtue of this structure whereby the wires are brought out from a point on the axis of the rotor shaft, danger of injury to the wires (however flexible the latter may be) is minimized. That is to say, the vibration is least at the axis of the generator shaft, and consequently there is a minimum of vibration on the leads 86.

At the side of the frame there is mounted a rectifier unit 90 conveniently of the dry disk type; although a copper oxide or other rectifier may be used in some cases, a selenium disk rectifier is at present preferred, since it has a very substantially larger output for a given weight than the copper oxide devices. On a small insulating panel at the top of the frame, suitable binding posts are provided as output terminals. By virtue of connections such as are more fully described below, the apparatus is adapted to deliver a low voltage direct or continuous current, as at terminals 91, 92; a low voltage alternating current between terminals 93, 94, and a high voltage alternating current between terminals 94, 95. For engine starting and other purposes hereinafter explained, a supplementary battery or source of electrical energy may be provided, and may conveniently consist of a plurality of very small dry cells, such as the smaller type of flash light cells. To hold a battery of such cells, an insulating tube 98 of fibre, Bakelite or the like is held between spring fingers 99, 100 at one side of the frame, each of the fingers 99, 100 being conveniently provided with an internal connecting spring 101 to abut and make contact with the end of a cell. A plurality of small flash light cells, say four, can thus be carried in the tube 98, end to end, with positive and negative ends successively in contact, and with the terminal poles of the resulting battery in spring-pressed contact with the members 101, 101 respectively. Loading or unloading of the tube 98 is effected simply by removing it from the spring fingers 99, 100 that ordinarily hold it in place.

Referring now to the wiring diagram, Fig. 7, it will be seen that the output of the low voltage winding 21 is brought not only to the terminals 93, 94 (so as to provide, for example, an A. C. output of 6.3 volts), but also to the input terminals of the rectifier 90, which may be of the bridge or full wave type. Leads from the output terminals 103, 104, of the rectifier extend to the binding posts 91, 92 so as to provide a low voltage output, for example, about six volts D. C.; and the rectifier output also extends to the ignition system of the engine. The terminals of the high voltage generator windings 20a, 20a, are connected to the binding posts 94, 95, so as to furnish an A. C. output of, say, 250 volts. Fuses 93a, 94a, 95a may be included in the leads from the generator windings, so as to avoid the danger of impairing the magnetization of the rotor upon an accidental short-circuit of a winding.

As explained, the engine ignition may include the usual ignition coil 70, having its secondary winding 105 connected at one side to the center or insulated terminal of the spark plug 42 and at the other side to the head or other grounded part of the engine 40, so as to provide the desired spark in accordance with the timing of the make and break contacts in the primary circuit. The primary 106 of the coil 70 is connected in series with a battery 107, comprising four small flash light cells, as previously described, and the timing or breaker contacts 45 of the engine, the latter being bridged by the condenser 72. The primary ignition circuit also includes a switch 108, which may be mounted on the frame (see Figs. 1 and 2), and may include a metal switch arm 109 pivoted on the mounting screw 110 for the battery-connecting finger 100. Near its other end, the arm 109 has a notch 111, to releasably engage an undercut switch point or button 112, whereby engagement of the arm with the button as shown in Fig. 1 closes the switch, and the arm may be swung counterclockwise (as viewed in Fig. 1) to open the switch.

As stated, the rectifier output terminals 103, 104 are connected to the ignition system, conveniently across the battery 107, and preferably across both the battery and the switch 108. With the latter connection, as shown in Fig. 7, the life of the battery is prolonged; i. e., if the battery is not disconnected from the rectifier when the engine is out of service, sufficient leakage of current in a reverse direction will work through the rectifier to discharge the small battery cells in a short time. When it is desired to start the engine, the switch 108 is closed and the drive shaft 43 of the engine is turned over. During this operation, the initial sparking is in part obtained or facilitated by the battery 107; at the same time and notably when the engine is running, the chief energy for the ignition system is obtained from the output of the rectifier, and hence from the low voltage winding of the generator. The battery 107 being connected across the rectifier output serves efficiently as a smoothing device for the ripple of the rectified current; although other smoothing means such as electrolytic condensers, or a combination of condensers and chokes may be used in some cases, it has been found that efficient operation of the engine is obtained with the illustrated arrangement. The output of the rectifier naturally comprises a continuous but rather sharply pulsating E. M. F., and it is believed that during the zero or low voltage portions of the rectifier output, the battery 107 serves to raise the voltage to the desired six volt value.

At the same time, it appears that the rectifier, during full voltage portions of its pulsating output, acts to rejuvenate or recondition the battery 107,—the dry cells of the latter serving, at least to that extent, as accumulators. Indeed, the rejuvenation thus obtained appears to be at least sufficient to make up for the drain on the battery 107 during the zero or low points in the rectifier voltage output. As a result, the life of the flashlight cells as used in the apparatus is, in effect, the same as their shelf life, there being substantially no net current drain from the battery; and by the same token, the cells need be only of a very small size,—an important factor in reducing the weight of the apparatus. Although dry cells are at present preferred, it will be appreciated that in some cases a battery of a more strictly secondary type may be used, for example, one wherein each cell comprises merely a pair of lead strips or wires immersed in dilute sulphuric acid.

In some cases, e. g., if the generator speed is a suitable multiple of the engine speed and the generator magnet is suitably poled relative to the engine timing cam, the engine can be operated directly from the rectifier without a battery. Very careful adjustments, however, are then usually necessary to obtain optimum results, and to start the engine, it must be turned over at a relatively high speed. Hence, the inclusion of a battery is preferable; and indeed positive precautions are often desirable to prevent the engine from running along on the generator at times when it is desired to stop the apparatus. To that end, for the switch 108 of Fig. 7 there may be substituted the switch of Fig. 7—A, having a pair of contacts 115, 116 which are bridged by the switch arm 117 when the latter is closed to operate the apparatus, and which are respectively connected to the rectifier terminal 91 and the timing contacts 45. Thus when the arm 117 is open, as shown, the rectifier is disconnected from the engine.

It will now be appreciated that the complete device affords a very light weight and highly efficient engine-generator adapted to supply power in substantial quantity, as for radio transmitters, receivers or the like. By virtue of instrumentalities such as contained in the illustrated embodiment, the small gasoline engine has its ignition circuit fed by the low voltage winding of the generator, and at the same time the generator itself may afford the described or any other variety of output voltages, of alternating or direct current. Moreover, the generator is such that it may efficiently provide an A. C. output at relatively high voltage, say of the order of 250 volts, and without loss of efficiency. That is, the structure of the generator including its air core and the use of the permanently magnetized rotor, as well as the structure of adjacent parts, are such as to avoid or minimize hysteresis or eddy current losses which, in other generators such as those having iron cores for stationary windings, rise sharply with an increase in speed of generator operation, i. e., with an increase in frequency. Moreover, and again unlike iron-cored devices, the present generator yields an increase rather than a decrease of efficiency as the load falls off. Indeed, in the illustrated generator, there are no appreciable losses when the windings are open-circuited, other than the very slight frictional losses in the bearings; and the preferred round disk rotor practically eliminates losses from windage. In other words, and particularly taking into account the small size and lightness of weight of the generator apparatus, its efficiency is extremely high.

Thus, for example, in an apparatus having structure and proportions substantially identical with those shown in the drawings (particularly Figs. 1 to 4 and 7) and wherein the outside measurements of the frame structure 54, 55, 56, 57 were approximately 7½ inches high, 7 inches wide and 6 inches deep, the generator was adapted to provide output voltages of the values set forth by way of example hereinabove, for a total power output of at least 40 watts. A single filling of the fuel tank 62 (containing approximately one pint) was sufficient to drive the apparatus continuously for more than six hours, while providing a continuous electric power drain, as stated, of about 40 watts. At the same time, the output frequency was maintained at about 364 cycles, which is particularly desirable for meteorological work or the like, wherein the frequency of the A. C. supply, when of the order stated, may serve conveniently as a basis for a desirably audible signal modulation in the radio transmitter; i. e., 350–400 cycles provides a far more readily detectable note for the signals than lower frequencies such as 60 cycles.

It will be appreciated, of course, that where other frequencies are desired, the apparatus may be geared or otherwise operated to provide them. Likewise, as will be understood by those skilled in the art, the structure may be designed to provide higher or lower voltages than as stated above; or, for example, if the number of turns in the stationary windings is appropriately increased, and the drive appropriately reduced in speed, a high voltage may be obtained at relatively low frequencies. However, by virtue of the ability of the apparatus to operate well at high speeds (such as in providing a 350-400 cycle output), the generator is enabled to produce substantially high wattages with a minimum amount of copper in the windings 20a, 20a and 21 and with a minimum amount of material in the rotor 22. This results in a reduction in the overall weight and permits unusually high electrical and mechanical efficiency, it being possible to obtain electrical efficiency in the neighborhood of 90-95% in the apparatus illustrated in Figure 1.

Although other rotor forms may be used in some cases, it is at present greatly preferred that the permanent magnet rotor or rotors be in the form of a solid of revolution mounted to rotate about its axis, and particularly a solid of substantially flat form, such as the plane-sided disk 22 shown in Figs. 1, 2 and 4 or the modified form of disk shown in Fig. 5 now to be described. Special advantages of rotors of the preferred configuration are their efficient magnetic characteristics, and also their mechanical balance and superior strength,—notably important attributes for the preferred operation at extremely high speeds.

The rotor 122 shown in section in Fig. 5 is generally of the same disk type as the rotor 22 of Fig. 1, but is provided with convex sides 125 so that it is substantially thicker at the center than at the edges. Although the thickening at the center of the disk may be provided by a stepped, conoid or other configuration, a curved surface, such as the spherical surface illustrated in Fig. 5, is satisfactory and is consequently here shown for purposes of illustration. In a number of ways, the rotor 122 shown in Fig. 5 is superior even to the rotor 22 of Figs. 1 to 4, for instance in the matter of strength (by reducing the weight at the edges of the rotor) and in the matter of magnetization for production of a strong magnetic field.

In some instances an increase of efficiency may be obtained with the arrangement shown in Fig. 6, notably for instance in small types of apparatus where only a relatively low power output is needed but where an exceedingly high efficiency is required. In the structure of Fig. 6, the shaft 23 carries not only the principal rotor disk 22a, but also a supplementary permanent magnet disk 222 mounted to rotate exteriorly of the windings 20, 20. The supplementary disk or rotor 222 is conveniently mounted as close as possible to the principal rotor 22a and is poled oppositely to the latter, as shown. By virtue of the resulting rotor structure comprising an astatic system of permanent magnets, the flux of the rotor is increased or sharply localized and is even more directly concentrated in and about the turns of the windings. As a result, the device will have a greater generating efficiency in many cases. Furthermore, structure of the character illustrated in Fig. 6 is of particular advantage where other parts of the generator apparatus, or other adjoining apparatus, may have a metal structure tending to set up eddy currents and consequent loss in the generator; it being now understood that the flux-localizing nature of the supplementary rotor serves to prevent or minimize such losses. Also to a certain extent, the supplementary rotor 222 and the rotor 22a serve as "keepers" for each other, so as to maintain the magnetization of each of them more permanently. The supplementary rotor 222 also provides an increase flywheel effect.

Although in some cases the supplementary rotor 222 may be of soft iron or other non-permanently magnetized paramagnetic material, or there may be provided a soft iron disk of such material on each side of the principal rotor and the stationary windings, the structure shown in Fig. 6 is very satisfactory and affords a practical flux-localizing arrangement to provide for the rotor a magnetic path of substantially less reluctance than air (i. e., of higher magnetic permeability), uniformly for all positions of the rotor.

It will be understood that the engine of the apparatus in Figs. 1, 2 and 4 may be started by any suitable means. For example, the engine shaft 43 may be provided, at its extremity beyond the gear 50, with a starting nut 115 having on its outer face the oppositely relieved shoulders 116, 116, to be engaged by a suitable starting tool (not shown) fitted over the nut and adapted to spin the engine. Such a starting tool may be operated, for example, in a drill chuck, or may comprise a spring wound, or cord-operated or other device, as will be appreciated by those familiar with small engines of this type. It will also be understood that, where possible, metallic mounting and other parts of the apparatus are preferably made of aluminum or magnesium alloys, or other light metals.

A somewhat modified and very satisfactory form of rotor mounting is shown in Figs. 8 and 9. A bronze insert 324 is riveted into a central hole in the magnet disk 322, and the shaft 23 is mounted, as by a driving or keyed fit, in a suitable hole in the insert. The hole in the disk has its edges countersunk (at 325, 325) and preferably notched as at 326, so that the metal of the insert will flow into the notches and prevent any movement between the insert and the disk.

The power output of the generator may be increased, where desired, in various ways, as by increasing the size of the windings 20, 20 and rotor 22 or by adding on and about the shaft 23, or elsewhere, additional generating units comprising like windings and permanently magnetized rotors, so that the elements are driven together from the engine. Moreover, for example, by using three such units with their rotor poles spaced angularly about the shaft, a three-phase output may be obtained; and another feature of structures embodying a plurality of units may reside in the provision of a relatively smoother D. C. output, of advantage in certain special cases. Fig. 10, for instance, illustrates one form of structure including three generating units with angularly spaced rotor poles. The three rotors 422, 522, 622 are all mounted on the common shaft 23, to be driven from the engine by the pinion 51. The corresponding windings 420, 520, 620 which may surround their rotors, as the windings 20 surround the rotor 22 of Fig. 4, are respectively connected to disk-type full-wave rectifiers 490, 590, 690, and the outputs of the latter are connected in parallel to the terminals 491, 492. With the rotor poles advantageously spaced 120° apart from each other (as shown), the resultant direct current at the terminals 491, 492 has six rather than only two pulses per revolution of the shaft, and the amplitude of pulsation is only a small fraction of the average voltage or current value—i. e., the rectified D. C. output is remarkably smooth.

As stated, the apparatus is admirably adapted for use with meteorological equipment such as balloon-carried radio transmitters. Other uses for the apparatus are numerous, including many situations where a readily portable power supply is needed, as with field radio or other signalling or control equipment.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the other without interfering with the more general results outlined, and the invention extends to such use within the scope of the appended claims.

I claim:

1. Portable electric generator apparatus comprising a light-weight, skeleton frame, a bracket, a miniature internal combustion engine carried by and on one side of the bracket, an electric generator having a permanent magnet rotor, carried by and on the other side of the bracket, said rotor being driven by said engine, and long, tensioned, elastic mounting members extending from outer parts of said frame to said bracket, to provide the sole support for said bracket, engine and generator.

2. Portable electric generator apparatus, comprising a light-weight frame, a high voltage alternating current generator having a low voltage winding and a permanent magnet rotor, a miniature internal combustion engine secured to said generator and mechanically connected to drive said rotor at high speed, a disk-type rectifier mounted on said frame with its input connected to said low voltage winding, means for carrying miniature cell means on said frame and for connecting the output of said rectifier in parallel with the cell means to supply ignition current for the engine, and means comprising long, tensioned elastic members extending to said frame, for suspending the generator and engine within the frame.

3. Portable electric generator apparatus comprising a frame, a miniature internal combustion engine, an electric generator associated with said engine and adapted and connected to be driven thereby, and long, tensioned, elastic mounting members extending from said frame and providing the sole support for said engine and generator.

4. The apparatus of claim 3 wherein the frame comprises a pair of spaced, rigidly connected skeleton frame plates, and which includes a plurality of supporting hooks connected to said engine, and generator and wherein the mounting members comprise a plurality of sections of rubber tubing, each section traversing one of the hooks and extending from both sides thereof to peripheral portions of the respective frame plates, and the ends of the tubing sections being carried through corresponding apertures in said portions of the frame plates and having plugs forced into the tubing ends within the apertures for there securing the said tubing ends.

5. Portable electric generator apparatus comprising a light-weight, substantially rectangular skeleton frame, an engine-generator assembly disposed wholly within said frame and comprising an air-core solenoid, a permanent magnet rotor mounted to rotate within said solenoid about an axis at an angle to the axis of the solenoid, and a miniature internal combustion engine for driving said rotor, and long, elastic rubber members fastened to corners of said frame and extending, clear and under tension, to said engine-generator assembly for the sole support thereof.

6. The apparatus of claim 5 which is completely self-contained and includes a fuel tank carried at an upper part of said frame for gravity feed of fuel to the engine, and means carried by the frame and electrically connected to the solenoid, for supplying ignition voltage to the engine from said solenoid.

7. Portable electric generator apparatus for supplying high voltage, comprising a supporting frame, an engine-generator assembly resiliently suspended thereby and comprising a solenoid including a high voltage winding and a low voltage winding, a permanent magnet rotor mounted to rotate within said solenoid about an axis at an angle to the axis of the solenoid, and a miniature internal combustion engine for driving said rotor at high speed, and means carried by the frame and electrically connected to said low voltage winding for effecting electrical ignition of the engine therefrom.

8. The apparatus of claim 7, wherein the last-mentioned means includes a rectifier electrically connected to the low voltage winding, an ignition coil for the engine adapted to be energized from the rectifier, and miniature dry cell means adapted to be connected in parallel between the rectifier and the ignition coil, to provide energization of the coil from the dry cell means for starting the engine and to provide rejuvenating action on the dry cell means during operation of the engine-generator assembly.

CHARLES F. WALLACE.